United States Patent
Yach

(10) Patent No.: US 6,198,691 B1
(45) Date of Patent: *Mar. 6, 2001

(54) FORCE PAGE PAGING SCHEME FOR MICROCONTROLLERS OF VARIOUS SIZES USING DATA RANDOM ACCESS MEMORY

(75) Inventor: Randy L. Yach, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/513,427

(22) Filed: Feb. 25, 2000

Related U.S. Application Data

(63) Continuation-in-part of application No. 08/887,876, filed on Jul. 3, 1997, now Pat. No. 6,055,211.

(51) Int. Cl.[7] ........................................ G11C 8/00
(52) U.S. Cl. ........................................ 365/238.5; 365/239
(58) Field of Search ................... 365/238.5, 235, 365/239; 711/105, 212, 214, 215

(56) References Cited

U.S. PATENT DOCUMENTS 6,055,211 * 4/2000 Yach ................................ 365/238.5

* cited by examiner

Primary Examiner—David Nelms
Assistant Examiner—David Lam
(74) Attorney, Agent, or Firm—Baker Botts L.L.P.

(57) ABSTRACT

A microcontroller architecture that adds a dedicated bit in the op-code decode field to force data access to take place on a page of the random access memory (RAM) for that instruction. This allows the user to have any page selected and still have direct access to the special function registers or the register variables that are located on a pre-defined page of the RAM. The setting of the dedicated bit will not affect the current operation of the microcontroller nor will the setting of the bit modify the currently selected address stored in a page select register currently being used by the microcontroller.

8 Claims, 2 Drawing Sheets

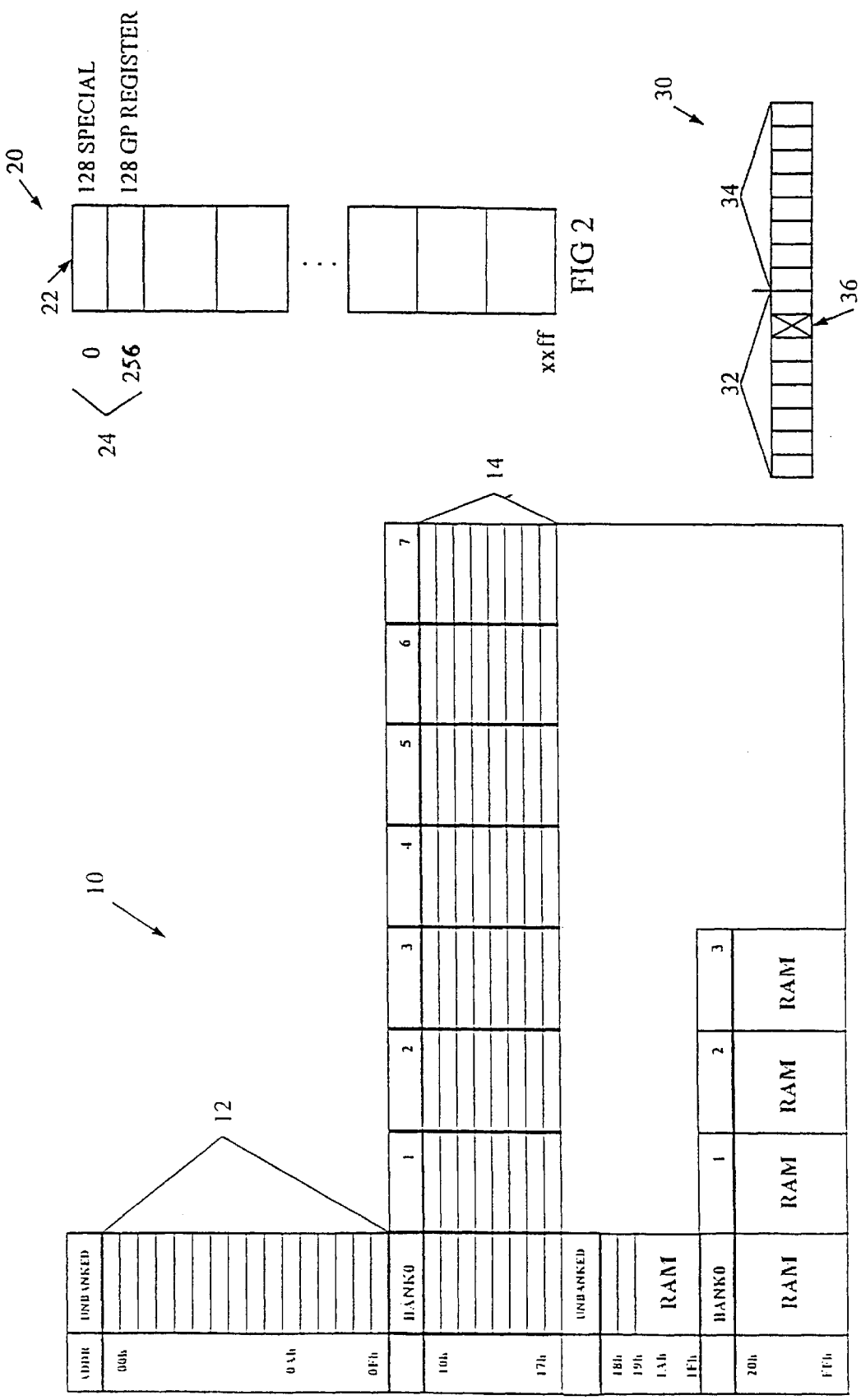
FIG 1 (PRIOR - ART)

FORCE PAGE PAGING SCHEME FOR MICROCONTROLLERS OF VARIOUS SIZES USING DATA RANDOM ACCESS MEMORY

RELATED APPLICATIONS

This application is a continuation-in-part of U.S. patent application Ser. No. 08/887,876, filed Jul. 3, 1997, now U.S. Pat. No. 6,055,211 entitled "Force Page Zero Paging Scheme For Microcontrollers Using Data Random Access Memory," which is assigned to the same assignee as the present application and for which there is at least one common inventor with the present invention.

FIELD OF THE INVENTION

This invention relates generally to microcontrollers and, more specifically, to a random access memory paging scheme for a microcontroller that will allow a user to have any page selected in the random access memory of the microcontroller and still have direct access to special function registers or the register variables without modifying the page select register of a current instruction.

BACKGROUND OF THE INVENTION

Current microcontrollers, including PIC microcontrollers, use a random access memory (RAM) paging scheme to address all the data memory. This scheme is extremely cumbersome in that it takes several instructions to ensure that the user is writing or reading the proper address in RAM. It also complicates the job of the C-compiler since the C-compiler must keep track of which page is currently selected in RAM. This presents even more problems when handling interrupts.

In classic microcontroller architecture, increasing the op-code field to handle larger addresses would solve the address paging problem. However, increasing the op-code field has the disadvantage of increasing the size of the microcontroller and thus increasing the overall cost of the microcontroller. Another way to alleviate the RAM paging problem is to map all special function and register dedicated memory space that is available in every bank or page. This wastes precious RAM space since every location that is mapped takes up one general purpose RAM location in every bank. If the micro has eight (8) pages, seven (7) locations of RAM are wasted.

Therefore, a need existed to provide an improved microcontroller architecture and paging scheme. The improved microcontroller architecture and paging scheme must allow for direct access to special function registers. The improved microcontroller architecture and paging scheme must allow direct access to special function registers without modifying the page select register of the current instruction being used by the microcontroller. The improved microcontroller architecture and paging scheme must further allow for direct access to special function registers without increasing the size of the microcontroller.

SUMMARY OF THE INVENTION

In accordance with one embodiment of the present invention, it is an object of the present invention to provide an improved microcontroller architecture and paging scheme.

It is another object of the present invention to provide an improved microcontroller architecture and paging scheme that allows direct access to special function registers without modifying the page select register of the current instruction being executed by the microcontroller.

It is still another object of the present invention to provide an improved microcontroller architecture and paging scheme that allows direct access to special function registers without increasing the size of the microcontroller.

In one embodiment, the present invention provides a paging scheme for a microcontroller that uses data random access memory to allow tracking of a currently selected address in the random access memory. The method comprises the step of dedicating a bit in each op-code instruction of the microcontroller. When the bit is set, the bit forces data access to take place on a section of the random access memory storing special and general purpose registers while not affecting current operations of the microcontroller. Even when set, the dedicated bit will not modify the currently selected address stored in the page select register currently being used by the microcontroller. The method may further comprise the steps of: linearizing an entire address range of the random access memory; and dedicating a specific address section of the random access memory to the special and general-purpose registers. The specific address section that is so dedicated can be any page within the memory. This is a useful feature of the present invention as it enables the utilization of, for example, programs that must use specific portions of memory (for instance the first page (0) or the last page (f)).

In accordance with another embodiment, the present invention provides a microcontroller having forced page architecture. The microcontroller has a random access memory that has an entire linearized address range. The random access memory is divided into plurality of pages wherein one page is dedicated to special and general purpose registers. A dedicated bit in each op-code instruction of the microcontrollers is used to force data access to take place on a page of the random access memory that stores the special and general purpose registers. The setting of the dedicated bit will not affect the current operations of the microcontroller nor will the setting of the bit modify the currently selected address stored in the page select register currently being used by the microcontroller.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 is a simplified data memory map of a prior art paging scheme for a microcontroller to address data memory.

FIG. 2 is a simplified data memory map of an 8-bit microcontroller having a forced page paging scheme.

FIG. 3 is a simplified diagram of a 16-bit op-code instruction.

DETAILED DESCRIPTION OF THE PREFERRED EMBODIMENTS

Referring to FIG. 1, a simplified block diagram of a prior art paging scheme 10 for a microcontroller to address data memory is shown. As stated above, all special function and register variables 12 are mapped in the first page of the RAM. However, since the special function registers 12 have to be accessible all the time, the special function registers 12 are mapped into every bank (i.e., Bank 1–7). This wastes precious RAM space since every location that is mapped takes up one general purpose RAM location.

Referring to FIG. 2, a microcontroller 20 with forced page architecture is shown. The microcontroller 20 uses a random access memory (RAM) 22 for storing data. The size of the RAM 22 is based on the particular use of the microcontroller 20. As can be seen from FIG. 2, the entire address range of the RAM 22 is linearized. By linearizing the address range, the problems associated with banking and page bits of the prior art are removed.

Figure 4:
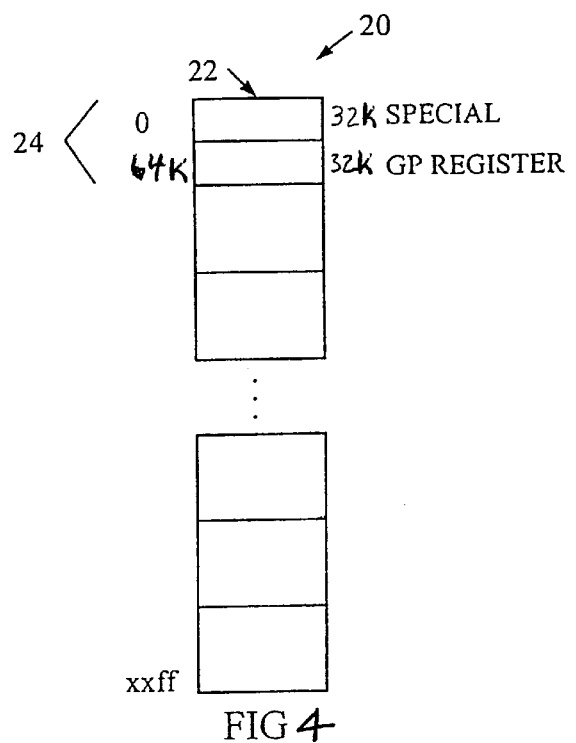
FIG. 4 is a simplified data memory map of a 16-bit microcontroller having a forced page paging scheme.

However, in general, many of the op-code instructions of the microcontroller 20 are limited in address space. In the preferred embodiment of the present invention, the microcontroller 20 is an 8-bit PIC microcontroller. Thus, many of the op-code instructions of the microcontroller 20 are limited to an 8-bit address. For this reason, the linear address range is broken into a plurality of pages. If the microcontroller 20 is an 8-bit microcontroller, the RAM 22 is divided into a plurality of 256 byte pages. However, as those of ordinary skill in the art will appreciate, the microcontroller 20 may be a 16-bit microcontroller or other size microcontroller. In the case where the microcontroller 20 is a 16-bit microcontroller, the RAM 22 can be divided into a plurality of 64K byte pages, as shown in FIG. 4. It should be appreciated by those skilled in the art, however, that other configurations are possible.

One page 24, known hereinafter as the forced page, is used for storing the special function registers 12 (shown in FIG. 1) and general purpose registers 14 (shown in FIG. 1). As stated above, these registers 12 and 14 need to be accessible at all times. However, in accordance with the present invention, any of the pages (e.g., (0) through (f)) can be used for storing the special function registers 12 and general purpose registers 14. An example of a possible use of this feature is during the call of an interrupt. For example, inside of an interrupt service routine, the user will not have to worry about the address stored in the page select register. In order to access special function registers and/or general purpose registers 12 and 14 the user simply selects the forced page bit 36. In the preferred embodiment of the present invention, the forced page 24 is broken into two 128 byte sections. The first 128 section stores the special function registers while the second 128 section stores the general purpose registers. In the case wherein the microcontroller 20 is a 16-bit microcontroller, the forced page 24 may be broken into two 32K byte sections. The first 32K section stores the special function registers while the second 32K section stores the general-purpose registers, as shown in FIG. 4. It should be appreciated by those skilled in the art, however, that other configurations are possible.

Referring now to FIGS. 2 and 3, in order to have the special and general purpose registers 12 and 14 accessible at all times, a bit 36 is dedicated in each op-code instruction 30 of the microcontroller 20 which when set forces data access to take place on, for example, the first page 24 (ie., page 0) of the RAM 22, or the last page (i.e., page (f)) of the RAM 22. As pointed out above, the present invention can be implemented using any of the pages available within the available memory (e.g. RAM 22). To facilitate this feature, one or more specific page select bits can be stored in a separate register.

The setting of the dedicated bit does not affect the current operation of the microcontroller 20 nor does it modify the currently selected address stored in the page select register currently being used by the microcontroller 20. Thus, no matter where the user is in the RAM 22, if the bit 36 is set, the current instruction will always affect the forced page (the page where data access is forced to, (e.g., page (0) or page (f)) which stores the special and general purpose registers 12 and 14. Thus, if a user is in the general purpose RAM area (i.e., any page except the forced page) and receives an interrupt, the interrupt service routine can set the dedicated bit 36 in the op-code instruction 30. The user may then deal with the special and general purpose registers 12 and 14 without affecting anything else the microcontroller 20 was doing. When the interrupt has been properly serviced, the microcontroller 20 may go back to the current address location in the RAM 22 since the address location was not modified during the service of the interrupt.

In the preferred embodiment of the present invention for an 8-bit microcontroller 20, the op-code instruction 30 is a 16-bit instruction. The first 8-bit section 32 defines the instruction and tells the microcontroller 20 what to do. The second 8-bits section 34 defines the address where the instruction is to be executed. The dedicated bit 36 is added to the first 8-bit section 32 of the op-code instruction 30 in order not to alter the address stored in an op-code instruction 30 when the dedicated bit 36 is set.

Figure 5:
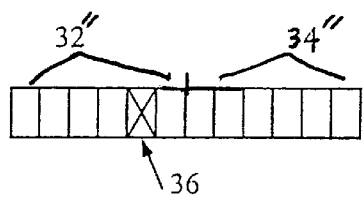
FIG. 5 is a simplified diagram of a 12-bit op-code instruction.

In a first alternate embodiment of the present invention, the op-code instruction 30' is a 12-bit instruction, as shown in FIG. 5. In this embodiment, the first section 32' is 6-bits wide, defines the instruction, and tells the microcontroller 20 what to do. The second section 34' is 6-bits wide and defines the address where the instruction is to be executed. The dedicated bit 36 is added to the first 6-bit section 32' of the op-code instruction 30' in order not to alter the address stored in an op-code instruction 30' when the dedicated bit 36 is set.

Figure 6:
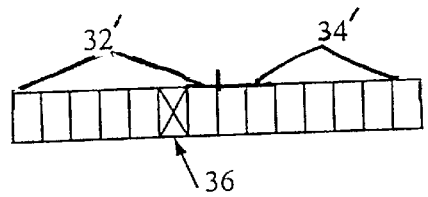
FIG. 6 is a simplified diagram of a 14-bit op-code instruction.

In a second alternate embodiment of the present invention, the op-code instruction 30" is a 14-bit instruction, as shown in FIG. 6. In this embodiment, the first section 32" is 7-bits wide, defines the instruction and tells the microcontroller 20 what to do. The second section 34' is 7-bits wide and defines the address where the instruction is to be executed. The dedicated bit 36 is added to the first 7-bit section 32" of the op-code instruction 30' in order not to alter the address stored in an op-code instruction 30" when the dedicated bit 36 is set. As those of ordinary skill in the art will appreciate, instructions 30 of any width (i.e., any multiple of 2) can be used.

In the preferred embodiment of the present invention, the dedicated bit 36 is only added to numeric processing op-code instructions of the microcontroller 20. By removing a few non-numeric processing op-code instruction decode map of the microcontroller 20, the dedicated bit 36 may be added in the numeric processing op-code instructions of the microcontroller 20 without increasing the size of the instruction decode map of the microcontroller 20.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A paging scheme for a microcontroller that uses data random access memory to allow tracking of a currently selected address in said random access memory comprising the steps of:

(a) linearizing an entire address range of said random access memory;

(b) dividing said linearized address range of said random access memory into a plurality of pages, wherein each of said plurality of pages is selected from the group consisting of 256 bytes and 64K bytes in size;

(c) dedicating a page of said random access memory to special and general purpose registers; and (d) dedicating a bit in each op-code instruction of said microcontroller which when set forces data access to take place on said dedicated page while not affecting current operations of said microcontroller and not modifying said currently selected address stored in a page select register being used by said microcontroller.

2. The paging scheme for a microcontroller according to claim 1, wherein said step of dedicating a bit in each op-code instruction of said microcontroller further comprises the step of dedicating a bit in only numeric processing op-code instructions of said microcontroller.

3. The paging scheme for a microcontroller according claim 2, wherein the step of dedicating a bit in only numeric processing op-code instructions of said microcontroller further comprises the step of removing non-numeric processing op-code instructions from an instruction decode map of said microcontroller to allow adding said dedicated bit in only said numeric processing op-code instructions of said microcontroller without increasing a size of said instruction decode map for said microcontroller.

4. A microcontroller having a forced page paging architecture comprising:

(a) system memory having an entire address range that is linearized, said system memory being arranged into a plurality of pages, each of said plurality of pages having a size selected from the group consisting of 256 bytes and 64K bytes, one page of said plurality of pages being dedicated to special and general purpose registers; and (b) said system memory comprising a plurality of op-code instructions, each op-code instruction having a dedicated bit which when set forces data access to take place on said dedicated page while not affecting current operations of said microcontroller and not modifying a currently selected address stored in a page select register being used by said microcontroller.

5. A microcontroller according to claim 4, wherein said dedicated bit is placed only in numeric processing op-code instructions of said microcontroller.

6. The microcontroller according to claim 4, wherein each op-code instruction is 12 bits wide, with the first six bits defining the instruction, the second six bits defining the address where the instruction is executed and the dedicated bit is added to the first six bits.

7. The microcontroller according to claim 4, wherein each op-code instruction is 14 bits wide with the first seven bits defining the instruction, the second seven bits defining the address where the instruction is executed and the dedicated bit is added to the first seven bits.

8. The microcontroller according to claim 4, wherein each op-code instruction is 16 bits wide with the first eight bits defining the instruction, the second eight bits defining the address where the instruction is executed and the dedicated bit is added to the first eight bits.

* * * * *